US006975952B1

(12) United States Patent
Dietermann et al.

(10) Patent No.: US 6,975,952 B1
(45) Date of Patent: Dec. 13, 2005

(54) APPARATUS AND METHOD FOR PLANNING BUS SYSTEMS

(75) Inventors: Lydia Dietermann, Vermold (DE); Gunnar Lessmann, Nieheim (DE); Ralf Aron, Detmold (DE); Dietmar Krumsiek, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 09/566,587

(22) Filed: May 8, 2000

(30) Foreign Application Priority Data

May 8, 1999    (EP) ................................. 99109127

(51) Int. Cl.$^7$ ............................................ G06F 19/00
(52) U.S. Cl. ..................................... 702/117; 702/118
(58) Field of Search ................................. 395/701, 800; 438/14; 702/122, 182, 221, 83, 57, 117, 119, 702/123, 118; 703/2, 13, 14, 25, 21, 121, 703/1; 709/221; 710/105; 706/919; 700/95–98, 700/1, 9, 86, 117, 182

(56) References Cited

U.S. PATENT DOCUMENTS

| | | | | |
|---|---|---|---|---|
| 5,663,076 | A | * | 9/1997 | Rostoker et al. ............... 438/14 |
| 5,713,034 | A | * | 1/1998 | Kunimine et al. ........... 395/800 |
| 5,941,966 | A | * | 8/1999 | Gotze et al. ................. 710/105 |
| 5,970,430 | A | * | 10/1999 | Burns et al. ................. 702/122 |
| 5,978,578 | A | * | 11/1999 | Azarya et al. ............... 395/701 |
| 5,983,269 | A | * | 11/1999 | Mattson et al. ............. 709/221 |
| 5,995,916 | A | * | 11/1999 | Nixon et al. ................. 702/182 |
| 6,219,628 | B1 | * | 4/2001 | Kodosky et al. ................ 703/2 |
| 6,411,923 | B1 | * | 6/2002 | Stewart et al. ................ 703/25 |
| 6,421,571 | B1 | * | 7/2002 | Spriggs et al. ................ 700/17 |
| 6,490,493 | B1 | * | 12/2002 | Dharnipragada ............. 700/97 |

OTHER PUBLICATIONS

Ulloa, G., "Fieldbus Application Layer And Real-Time Distributed Systems", Industrial Electronics, Control and Instrumentation, Proceedings 1991 IECO International Conference, 1991, vol. 3, pp 1679-1683.*

Knizak, M; Kunes,M; Manninger, M; Sauter, T;"Modular Agent Design for Field Bus Management";$7^{th}$ IEEE Conference on Emerging Technologies and Factory Automation; vol. 2; 1999; pp 857-864.*

Wollschlaeger, M;"Planning, Configuration and Management of Industrial Communication Networks Using Internet Technology"; IEEE Global Telecommunications Conference; vol 2; 1998; pp 1184-1189.*

Wollschlaeger, M;"Intranet-Based Management Network for Industrial Communication Systems"; Technology; 7th IEEE Conference on Emerging Technologies and Factory Automation; vol. 2; 1999; pp 823-830.*

(Continued)

Primary Examiner—John Barlow
Assistant Examiner—Douglas N. Washburn (57) ABSTRACT

According to the invention, a method and an apparatus are provided for determining bus system parameters and/or configurations, in particular of field bus systems, in the form of digital information, lists, plans and graphical representations, which apparatus comprises a device for detecting, storing and selecting both machine-related and bus-related data and, furthermore, has at least one output device for outputting and/or displaying and/or transmitting data.

19 Claims, 5 Drawing Sheets

OTHER PUBLICATIONS

Diedrich, C; Neumann, P;"Field Device Integration in DCS Engineering Using a Device Model"; Proceedings 24$^{th}$ IEEE Conference of Industrial Electronics Society; vol. 1; Aug. 31-Sep. 1998; pp 164-168.*

Warrior,J;"A Messaging Protocol for Field Instrument Applications";Proceedings 7th Annual Control Engineering Conference; Jun. 1988; pp XXI-13-XXI-19.*

Bisone, L; Scianna, A;"A CAD Multiprocessor System for Advanced Real-Time Process Application"; Proceedings Euromicro Workshop on Parallel and Distributed Processing; Jan. 25-27, 1995; pp 494-501.*

Roberts, D;" 'OLCHFA'A Distributed Time-Critical Fieldbus";IEE Colloquim on Safety Critical Distributed Systems; Oct. 2, 1993; pp 6/1-6/3.*

Weaver, A; Simonic, R;"Computer Communications for Factory Automation"; Conference Proceedings IEEE Intn'l Symposim on Industrial Electronics; Jun. 1-3, 1993; pp 413-418.*

Franco, L;"Transmission Scheduling for Fieldbus: A Strategy to Schedule Data and Messages on TH Bus with End-to-End Constraints";IEEE intn'l Joint Symposium on Industrial Electronics; vol. 1 2002; pp 67-72.*

* cited by examiner

APPARATUS AND METHOD FOR PLANNING BUS SYSTEMS

The invention relates to an apparatus and a method for determining bus system parameters and/or configurations, in particular for fieldbus systems, in the form of digital information, lists, plans and graphical representations, as claimed in claims 1 and 10.

Methods are known which are used essentially in manual form to assist the process of configuring the fieldbus technology within the process of system automation. In these methods, the peripheral signals from, for example, sensors or actuators which must be processed to drive the machines are defined first of all. Depending on the peripheral signals to be detected, appropriate fieldbus modules are then selected and are connected to the sensors and actuators used. The so-called fieldbus topology is then defined in order to interconnect the fieldbus modules in a suitable manner.

In practice, it has been found that, where the fieldbus modules are installed in cabinets, the time penalty for manual planning of the above steps can still be kept within limits. However, fieldbus modules are now no longer used only in cabinets but are also widely distributed directly on the system, and the planning effort has increased virtually as much as the effort required for retrospective adaptations.

The invention is thus based on the object of avoiding the above disadvantages, that is to say providing an apparatus and a method, which apparatus simplifies the planning and implementation of, in particular, automation requirements on the basis of fieldbus technology, and which apparatus furthermore assists and allows new procedures for the process of configuring corresponding systems.

This object is achieved by the features of claims 1 and 10. According to the invention, an apparatus for determining bus system parameters and/or configurations, in particular for fieldbus systems, in the form of digital information, lists, plans and graphical representations is provided which comprises a device for detecting, storing and selecting both machine-related and bus-related data and, furthermore, has at least one output device for outputting and/or displaying and/or transmitting data.

Furthermore, in order to achieve the object according to the invention, a method is specified which can be used for defining or providing bus system parameters and/or configurations, in particular for fieldbus systems, in the form of digital information, lists, plans and graphical representations. In this case, the method comprises the step of detecting storing and selecting both machine-related data and bus-related data, which can then be output and/or displayed and/or transmitted in a further step.

The method according to the invention and the apparatus according to the invention for the first time provide the capability, in the form of steps, of simplifying and speeding up automation requirements on the basis of fieldbus technology, to assist planning and implementation.

In an advantageous development of the apparatus according to the invention, this apparatus comprises a device for carrying out selective manual and/or automated logical operations on the input data. In particular, a device such as this offers the advantage that it is able to match machine-related and bus-related data detected by the apparatus according to the invention. This means that the apparatus according to the invention is able either fully automatically to link the input machine data to the data from the detected bus modules, or it is possible to operate the apparatus manually as well, in order to produce the appropriate logic operations. Such logic operations may, in particular, comprise linking data from connection points of, for example, sensors and/or actuators to corresponding data from associated fieldbus modules. The peripheral signal data required for this purpose must, or course, first of all have been recorded and/or stored in the apparatus according to the invention in the course of detecting machine-related data.

Within the scope of the invention, the machine-related data comprise, in particular, design data relating to the detection, setting and processing or peripheral signals from the sensors and/or actuators mentioned above. In this case, the apparatus according to the invention advantageously has devices for reading such data, as are known to a person skilled in the art and working in this field. Such interfaces may, however, also be used, for example, to link or connect a CAD system for machine design, in order in this way to allow direct access to the appropriate data.

Furthermore, in an advantageous development of the subject matter of the invention, the apparatus comprises a device which is able, for example, to assign suitable addressing to a data record comprising machine-design data and bus-related data. Such addressing is of major use since the apparatus according to the invention is in consequence able to provide data for subsequent programming of an automation system even at the stage when the fieldbus system is being planned. This also offers the opportunity to link or couple a programming tool to the apparatus according to the invention and/or to the planning tool according to the invention.

In a further very highly advantageous development of the apparatus according to the invention, this apparatus comprises a device for providing a bus system architecture. On the basis of different requirements for logic operations between machine-bus-related data and/or bus-bus-related data, this device is able to produce a bus system architecture, and check the feasibility of this bus system architecture. The process of providing the system architecture and the bus topology in this case comprises, for example, detailed interconnection requirements, on the basis of which the topology that is produced can be implemented in practice.

The apparatus according to the invention accordingly and advantageously allows the configuration of fieldbus systems. The configuration may in this case be related to various detail and/or viewing levels. Such a selective approach allows the user to use the apparatus according to the invention on the basis of specific interests, problems or functions. In this context, it is also possible to produce signal lists with associated control addresses, for example, which give a programmer sufficient information for subsequent or parallel programming of the system.

In this case, it is likewise a major factor that the apparatus according to the invention also comprises a device which allows an interactive logic operation to be carried out on both internal and external data and data fields. This results in the positive effect that changes which, for example, have been completed in one view can, if desired or necessary, be transferred to other data or data fields and/or views, directly and/or interactively. However, this also means that all views access the same database and that these views are interactively linked.

A positive development of the subject matter of the invention also provides for an ECAD processing tool, which is known to a person skilled in the art, to be included in the apparatus according to the invention and/or in the processing tool according to the invention. Such a link has the advantage that the processed and/or stored data provided by the apparatus according to the invention can be used to produce a circuit diagram directly.

Particularly in the step of detecting, storing and selecting in the process of reading machine-related data, the method developed in the course of the invention comprises the step of detecting design data. Such data essentially relate to peripheral signals from the sensors and/or actuators of machines or machine parts which signals are intended to be detected, set and processed in order to operate the system. The said data are read to the apparatus according to the invention, and are processed further, either separately as logic-operation data between bus modules and the installation location in the machine, or as linking data between bus modules. This means that the interactive signaling of the machines or of the machine parts and the bus modules have been defined even before being input into the apparatus according to the invention. The correctness of the logic operations is then checked in the course of the method according to the invention.

In addition to selective reading of various logic operation data, it is also possible in the method according to the invention to read information directly from a machine construction drawing which has been produced, for example, using a CAD system, in the course of a method step which can be selected on an optional basis.

In further method steps, bus modules are then selected on the basis of the data which has been read, and these bus modules are assigned different design data and/or machine or machine parts sensors and/or actuators to be driven. So-called signal lists can then be produced on the basis of these logic operations.

However, the further processing of the information recorded in the method step of detecting, storing and selecting not only involves linking bus modules to peripherals to be driven but, in a further step, likewise interactively connecting the bus modules themselves to one another. The arrangement of bus modules which result from this is output in the form of a bus interconnection list, in the step of outputting and displaying the data in conjunction with the method according to the invention.

With respect to producing the data lists described above, the method according to the invention comprises a further step, which may optionally be applied to data records or data, such that the data or the data records are assigned an address. Subsequently, this addressing is essentially used for further-processing of the data by the automation program to be produced by a programr.

In a further very highly advantageous development of the subject matter of the invention, the method according to the invention furthermore has a method step during which a bus system architecture or bus topology is produced on the basis of the data which has been entered and/or on which logic operations have been carried out. Once the bus system has been designed, the bus topology produced on the basis of the input data or parameters are then checked, in the course of the method according to the invention, for technical feasibility. Should any problems occur in this context, it is possible in the course of a further step of the method according to the invention to make adjustment proposals which would lead to a bus system which can run. Data can also, of course, be input manually independently of this.

In an advantageous development of the subject matter of the invention, it is also possible, in a further method step, to pass on to an ECAD data processing tool data obtained in the course of the method. In this way, it is possible to develop a circuit diagram directly from the data obtained, which can then be implemented in practice.

The invention will be described in more detail in the following text using preferred embodiments and with reference to the attached drawings, in which.

The exemplary embodiment which is described in detail in the following text is essentially a tool for planning and configuration of automation systems, which comprises a plurality of individual tools, which are each responsible for task elements for the purposes of the method according to the invention and the apparatus according to the invention.

On the one hand, the apparatus according to the invention assists planning according to the previous prior art. In this case, fieldbus modules, sensors and actuators are selected from an electronic, customer-specific catalog, and their interconnections to one another are checked for functionality, with an interconnection requirement being generated from this. In this context, the aim is also to minimize the capability of tools according to the invention, the planning of the links between the fieldbus modules, and the connections to the modules.

On the other hand, machine design data are read to the apparatus in order to assist known planning methods which are essentially carried out manually. When the data are being processed, the system according to the invention determines which peripheral signals need be detected, set and processed, for example, by sensors or actuators in order to operate the system. In this case, external access may also be made to the assignment described above on the apparatus according to the invention. Depending on the nature of the sensors and actuators to be used, for example the maximum current drawn by the sensor and the number of sensors, the apparatus according to the invention chooses fieldbus modules from a defined catalogue as appropriate. At this point, it should also be mentioned that this selection process does not require the apparatus according to the invention to be exclusively automatic in operation, and it is also possible to make external access or to carryout external actions relating to the selection of the modules, depending on the requirement. A corresponding situation also applies to the subsequent functions of the apparatus according to the invention. As a rule, the apparatus in this case refers back to modules already used in conjunction with existing automation systems and defines which peripheral signals are connected to which fieldbus module, and where in the system the individual modules are placed. The bus topology is then produced, and the bus modules required for implementation, the cables required and, if appropriate, any interface converters required are defined. If desired, the apparatus according to the invention may also estimate the required cable length if, for example, a chart of possible machine locations has been entered.

In a simplified embodiment of the apparatus according to the invention, signal lists can be processed by the apparatus which have already been produced by responsible personnel but which would otherwise be produced by the apparatus itself. As already indicated above, the signal lists essentially include information relating to the signaling for individual machine parts.

Figure 1:
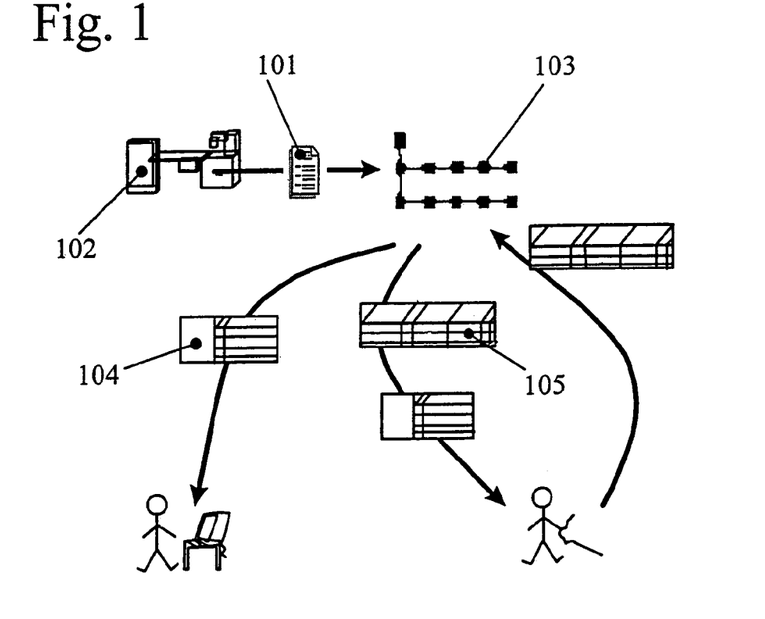
FIG. 1 shows an output-oriented illustration of the method according to the invention and of the apparatus according to the invention.

In this context, FIG. 1 shows the process of reading 101 and further processing the signal list data 104. In this case, the signal list is produced from the matching of the mechanical design 102 and electrical design 103, in the simplest case by a planner and in the automated case by the system according to the invention. This includes, in particular, data relating to peripheral signals which are sequentially assigned to bus modules. These signals comprise, for example, information relating to the sequential number of the peripheral signal, its function and its equipment identity (BMK). (In this context, see FIG. 5).

In addition, the apparatus according to the invention or, in the simplified embodiment a planner once again, produces a bus interconnection list 105 for each machine part 102, which bus interconnection list 105 is associated with the signal list 104 and contains information relating to the machine part 102 and the fieldbus module type. The signal list 104 and the bus interconnection list 105 are completed both in the simplified use and in the fully automatic use of the apparatus according to the invention in the subsequent inventive method step. In the process, the equipment identity of the connected fieldbus module and the module terminal are entered in the signal list 104 for each sensor signal, and connected to the sensor or actuator. Furthermore, the bus interconnection list 105 has added to it the equipment identity (BMK) of the interbus module used and the sequence of the interbus modules used, and the number of meters required of the respective cable type to be used are listed. The completed and defined lists are then further processed by the apparatus according to the invention, in both embodiments. The apparatus according to the invention uses the supplied data, in particular from the bus interconnection list 105 to produce the fieldbus topology. Furthermore, the apparatus according to the invention checks whether the bus topology which is produced is technically feasible, or whether it contains errors. In addition, the signal list 104 [lacuna] the apparatus according to the invention has information about the bit address and byte address added to it as appropriate, on the basis of the information as to which bus device has been used and which equipment terminal has been used.

As already mentioned above, manual adaptation of the parameters and bus topologies determined by the apparatus is also possible. In this way, if necessary, the apparatus according to the invention and the method according to the invention allow the configured bus systems to be matched or adapted to the practical requirements for their implementation, in the course of an interactive process.

A so-called bus design editor 200 (FIG. 2) is used in a further preferred embodiment or use of the apparatus according to the invention.

Figure 2:
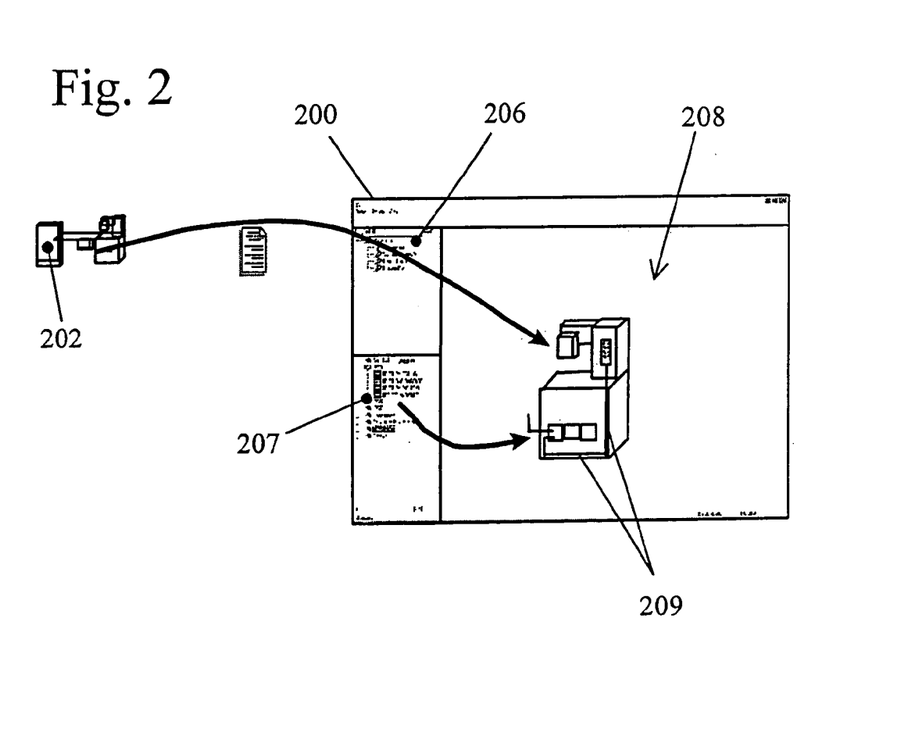
FIG. 2 shows a schematic illustration which is intended to show the design of a bus system based on the mechanical design parameters that have been read.

The bus design editor 200 reads machine-related data 202, for example from a machine construction drawing for a machine part, to the apparatus according to the invention. The bus design editor 200 places the fieldbus modules 206 associated with the machine part at the top left in the corner of an output page, once the bus interconnection list 105 has been completed for this machine part, 102, 202. If this should not be the case, the apparatus according to the invention can select individual modules 207 from a company-specific index of fieldbus modules used, either automatically or by means of external instructions. In both cases, the modules are placed on the machine construction drawing 208 without any constraints. The modules are in this case linked to one another by lines 209, which represent the cables for data transmission and power supplies. These lines are then assigned, for example, cable parameters, such as their length. The apparatus according to the invention can then use the information stored in this way to produce a bus interconnection list 105 and a bus topology automatically or, optionally, under external control, or to import or export the information to an ECAD tool, and produce a circuit diagram.

Figure 3:
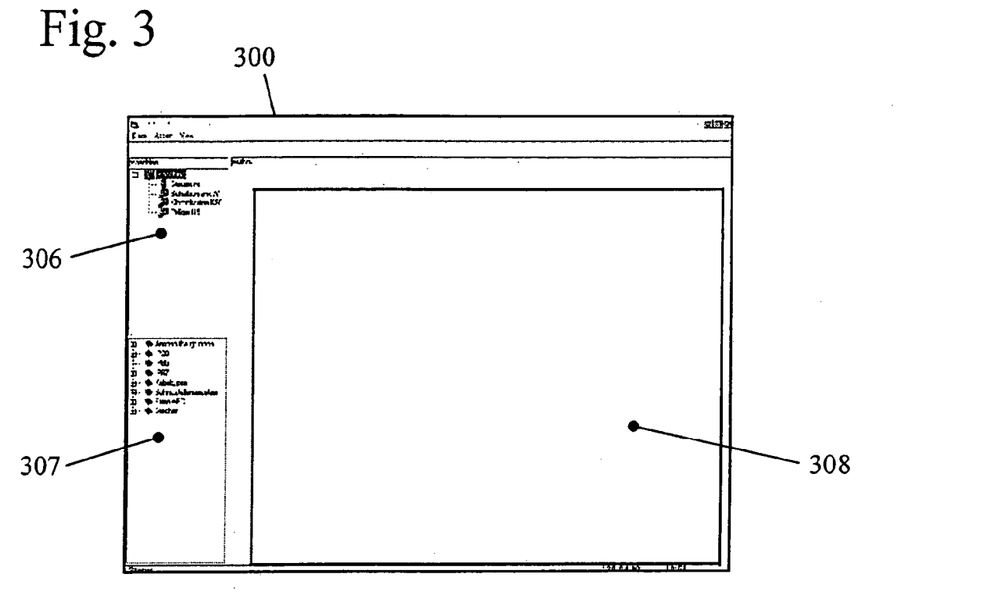
FIG. 3 shows the basic screen layout of the projection apparatus according to the invention.

FIG. 3 shows the basic screen layout 300. The system is visualized at the top left 306, and the electronic equipment store is shown at the bottom left 307, from which the user or the apparatus according to the invention can select equipment. The view selected by the user in the "View" menu item appears on the right-hand side 308.

Figure 4:
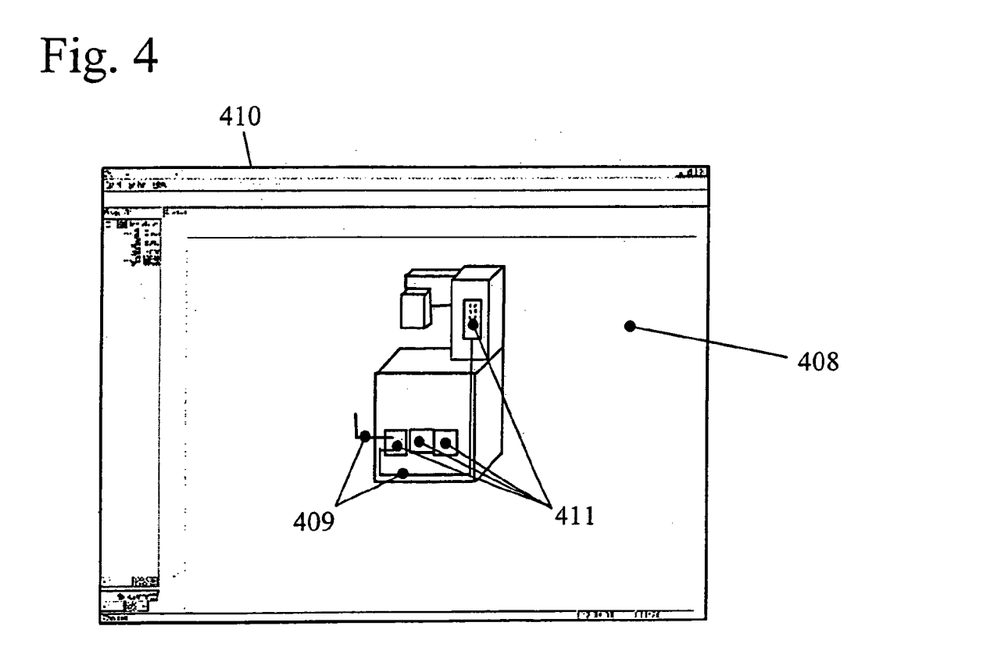
FIG. 4 shows a schematic illustration which shows the screen layout when the design view has been chosen as the view.

The design illustration in FIG. 4 shows the screen layout when the view 410 "Design" has been selected. The machine construction drawing is shown in the background on the right-hand part of the illustration 408. The foreground contains schematic drawings of the interbus modules 411 and the cables 409 which connect them together. The illustrated partial step of the method according to the invention is used to plan the power supply and the bus connection for the modules, and to give the user the option of arranging the modules in the program in the same way as they are actually installed in the system.

Figure 5:
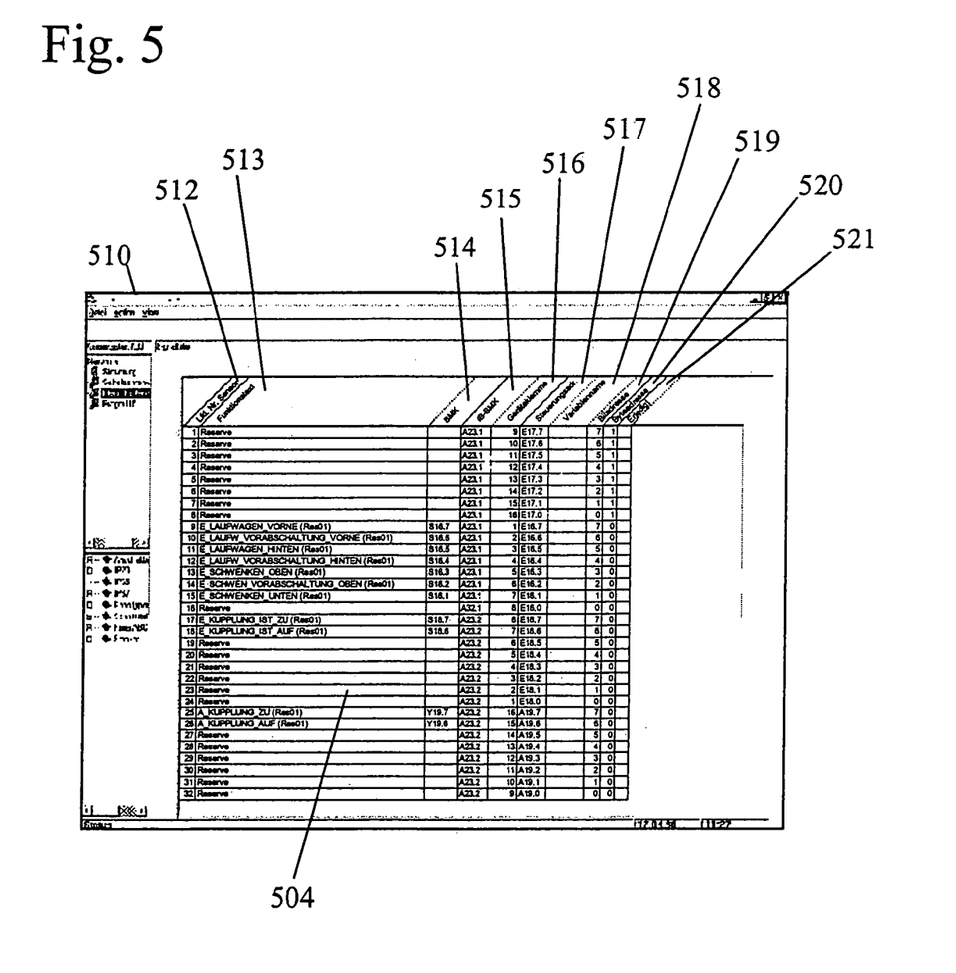
FIG. 5 shows the screen layout of the apparatus according to the invention when the signal-list view has been selected as the view.

The signal list in FIG. 5 shows the screen layout when view 510 "Signal List" 504 has been selected. The right-hand part of the illustration contains the signal list 504 with the columns "Sensor Serial No." 512, "Function Text" 513, "BMK" 514, "IB-BMK" 515, "Equipment Terminal" 516, "Control Address" 517, "Variable Name" 518, "Bit Address" 519, "Byte Address" 520 and "Completed" 521.

Figure 6:
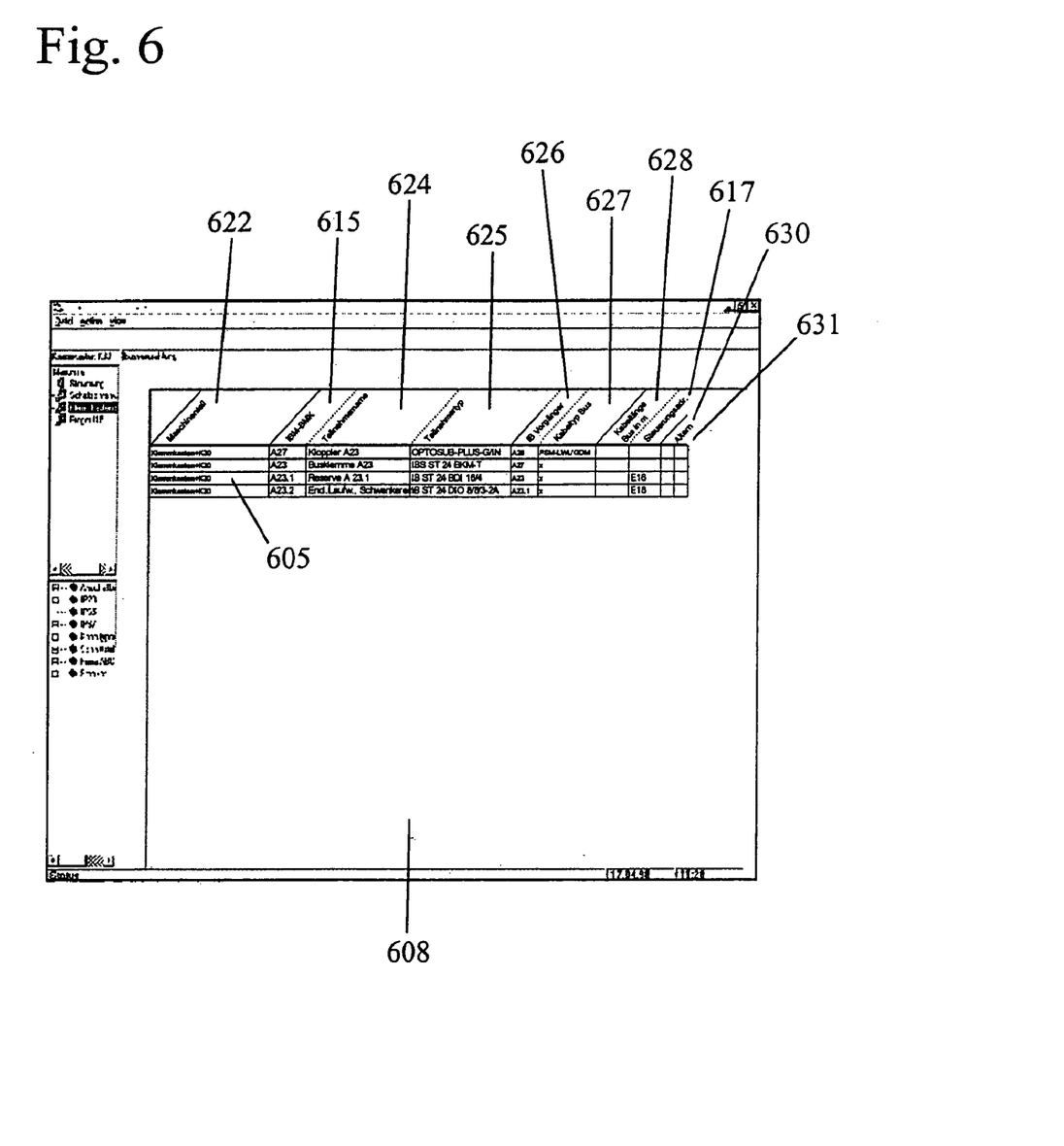
FIG. 6 shows the schematic screen layout of the apparatus according to the invention when the bus interconnection list view has been selected as the view.

The bus interconnection list in FIG. 6 shows the screen layout when the view 610 "Bus Interconnection List" 605 has been selected. The right-hand path of the FIG. 608 shows the bus interconnection list 605 with the columns "Machine Part" 622, "IB-BMK" 615, "Subscriber Name" 624, "Subscriber Type" 625, "IB Predecessor" 626, "Cable Type Bus" 627, "Cable Length in m" 628, "Control Address" 617, "Alternative" 630 and "Completed" 631.

For the purpose of the invention, the "Completed" and "Alternative" columns are used as result columns for the practical implementation. The person responsible uses these columns for example, to enter comments relating to the points at which he has had to make changes from the requirements of the specific plan for the practical implementation. This information can then in turn be read to the apparatus according to the invention, and can be used for adaptation of the status existing there, for the purposes of nominal/actual comparisons.

Figure 7:
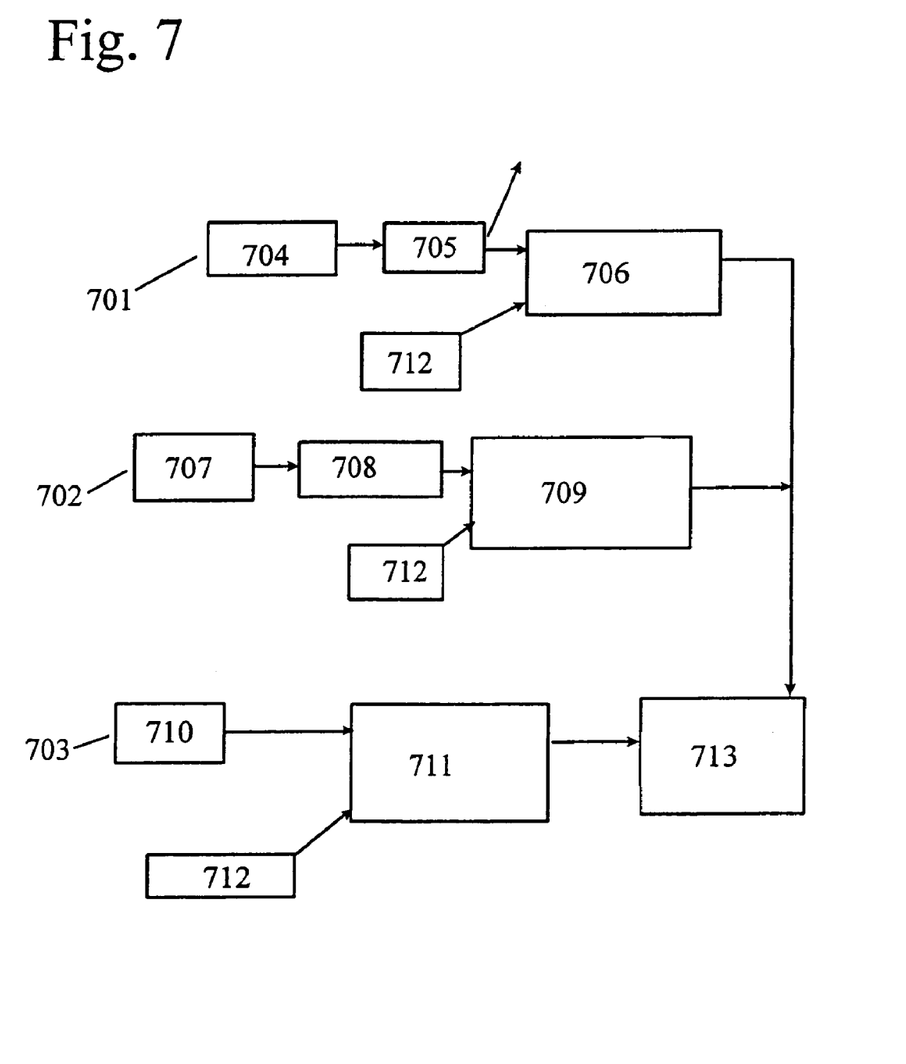
FIG. 7 shows an overview of possible solution versions for the purposes of the method according to the invention and the apparatus according to the invention.

FIG. 7 shows a block diagram which is intended to explain various levels of the method according to the invention in an overview. A distinction 701, 702, 703 is drawn there between a total of three possible processing levels, broken down roughly, which are combined like modules in the apparatus according to the invention. This comprises the level of signal list production 701 using the signal list tool, the level of bus interconnection list production 702 using the bus interconnection list tool, and the level of the bus design editor 703, which may at least partially cover the levels referred to above and, in addition, can be used for topology design. The individual tools may be used either selectively or in combination. The apparatus according to the invention therefore also directly offers the option of being used to assist existing paper-oriented methods.

The essential steps of signal list production are the step of defining and/or detecting the peripheral signals and the equipment identities of the sensors and actuators of the machine part 704, the step of signal list generation 705, and the step of addressing, by producing bit and byte addresses 706.

The bus interconnection list production 702 is carried out in particular on the basis of the following sub-steps: detecting and/or defining the relevant machine parts and the bus subscriber type 707, producing the bus interconnection list 708 and checking the interconnections 709.

Level 703 of the bus design editor includes, among other items, the step of reading the machine construction drawing 710 and the step of checking the interconnections and producing a complete interconnection instruction 711, as essential method steps.

All levels allow the option of being able to make supplementary inputs 712 in order, for example, to allow an "actual-nominal" or "practical-theoretical" adaptation to be carried out or, in addition, in order to attach modules and cables, that is to say information.

Furthermore, all the levels are connected to a so-called documentation level 713 on which, for example, circuits and/or documentation can be produced using a documentation tool. By way of example, one such tool may be the already mentioned ECAD tool.

What is claimed is:

1. An apparatus for planning of parameters or bus system configurations, comprising:
    a device for planning bus system parameters or configurations in a form of at least one of digital information, plans and graphical representations, including:
    a device that detects, stores and selects input data comprising machine-related data and bus-related data, a device that automatically provides a bus system architecture on the basis of the input data, and
    at least one output device that at least one of outputs, displays, and transmits data.

2. The apparatus as claimed in claim 1, wherein the apparatus comprises a device that carries out selected manual or automated logical operations on the input data.

3. The apparatus as claimed in claim 1, wherein the apparatus comprises a device that addresses the bus data.

4. The apparatus as claimed in claim 1, wherein the machine-related data comprises, in particular, design data and, in particular, data relating to sensors or actuators.

5. The apparatus as claimed in claim 1, wherein the apparatus comprises a device that carries out interactive logic operations on data fields or data.

6. The apparatus as claimed in claim 1, wherein the apparatus is used for configuration on fieldbus systems.

7. The apparatus as claimed in claim 1, wherein the apparatus comprises a device that reads data from a machine construction drawing.

8. The apparatus as claimed in claim 1, wherein an ECAD processing tool is linkable to the apparatus.

9. A method for planning bus system parameters or configurations in a form of at least one of digital information, lists, plans and graphical representations, comprising the following steps:
    a) detecting, storing and selecting input data comprising machine-related data and bus-related data,
    b) automatically designing a bus system architecture on the basis of the input data, and
    c) at least one of outputting, displaying, and transmitting data by an output device.

10. The method as claimed in claim 9, wherein the step of detecting, storing and selecting machine-related data comprises, in particular, the step of detecting design data.

11. The method as claimed in claim 9, wherein the step of detecting, storing and selecting design data comprises, in particular, the step of detecting data from machine or machine part sensors or actuators that are to be driven.

12. The method as claimed in claim 9, wherein the step of detecting, storing and selecting comprises the step of reading a machine construction drawing.

13. The method as claimed in claim 9, wherein the method comprises the step of matched selection and assignment of bus modules to the design data.

14. The method as claimed in claim 13, wherein the step of selection and assignment of bus modules comprises the step of at least partially carrying out logic operations on the machine-related data and the bus-related data.

15. The method as claimed in claim 9, wherein the method comprises the step of at least partially carrying out matched logic operations between the bus modules.

16. The method as claimed in claim 9, wherein the method comprises the step of addressing data.

17. The method as claimed in claim 9, wherein the method comprises the step of testing the bus system architecture.

18. The method as claimed in claim 9, wherein the method comprises the step of interchanging data with an ECAD data processing tool.

19. The method as claimed in claim 9, wherein the bus system comprises fieldbus systems.

* * * * *

UNITED STATES PATENT AND TRADEMARK OFFICE
CERTIFICATE OF CORRECTION

PATENT NO.         : 6,975,952 B1
APPLICATION NO.    : 09/566587
DATED              : December 13, 2005
INVENTOR(S)        : Deitermann et al.

It is certified that error appears in the above-identified patent and that said Letters Patent is hereby corrected as shown below:

On Title Page Item (75)
Please correct the name of the First Named Inventor to appear on the patent as follows:

From:
Lydia Dietermann of Vermold, DE

Should read,
Lydia Deitermann of Ziegeleistrasse 28, 33775 Versmold, DE

Signed and Sealed this

Ninth Day of January, 2007

JON W. DUDAS
*Director of the United States Patent and Trademark Office*